US008588037B2

(12) United States Patent
Yamada et al.

(10) Patent No.: US 8,588,037 B2
(45) Date of Patent: Nov. 19, 2013

(54) MAGNETIC DISK DEVICE, MAGNETIC DISK EVALUATION APPARATUS, AND MAGNETIC HEAD

(75) Inventors: Yuuichi Yamada, Tokyo (JP); Tomoko Taguchi, Tokyo (JP); Yoshinobu Fuchizaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/419,394

(22) Filed: Mar. 13, 2012

(65) Prior Publication Data

US 2013/0176835 A1 Jul. 11, 2013

(30) Foreign Application Priority Data

Jan. 10, 2012 (JP) .................... 2012-002244

(51) Int. Cl.
*G11B 11/00* (2006.01)
(52) U.S. Cl.
USPC ............. 369/13.14; 369/13.05; 360/59
(58) Field of Classification Search
USPC ......... 369/13.14, 13.05, 13.33, 13.02, 13.32, 369/13.24, 13.17; 360/59, 25, 53, 13.33
See application file for complete search history.

(56) References Cited

U.S. PATENT DOCUMENTS

| 5,910,861 | A | * | 6/1999 | Ahn ............................ 360/46 |
| 7,372,648 | B2 | | 5/2008 | Akiyama et al. |
| 7,522,499 | B2 | * | 4/2009 | Hosokawa et al. ...... 369/47.52 |
| 8,179,624 | B2 | * | 5/2012 | Inomata ..................... 360/25 |
| 8,351,144 | B2 | * | 1/2013 | Nakamura et al. ........... 360/59 |
| 2008/0094744 | A1 | | 4/2008 | Inomata |
| 2008/0204917 | A1 | | 8/2008 | Nakamura et al. |

FOREIGN PATENT DOCUMENTS

| JP | 2002-298302 | 10/2002 |
| JP | 2008-103030 | 5/2008 |
| JP | 2008-210426 | 9/2008 |

\* cited by examiner

*Primary Examiner* — Ali Neyzari
(74) *Attorney, Agent, or Firm* — Patterson & Sheridan, LLP

(57) ABSTRACT

A magnetic disk device of an embodiment includes a magnetic disk, a magnetic head, a laser-beam-intensity control unit, a reproduced-signal detecting unit, and a magnetic-disk evaluating unit. The magnetic head reads a signal recorded in the magnetic disk, or performs magnetic recording while irradiating a laser beam onto the magnetic disk. The laser-beam-intensity control unit controls the intensity of the laser beam. The reproduced-signal detecting unit detects the signal read by the magnetic head. The magnetic-disk evaluating unit evaluates the signal read from the magnetic head, on the basis of a relation between a noise level detected from the signal read by the magnetic head, and the intensity of the laser beam.

12 Claims, 14 Drawing Sheets

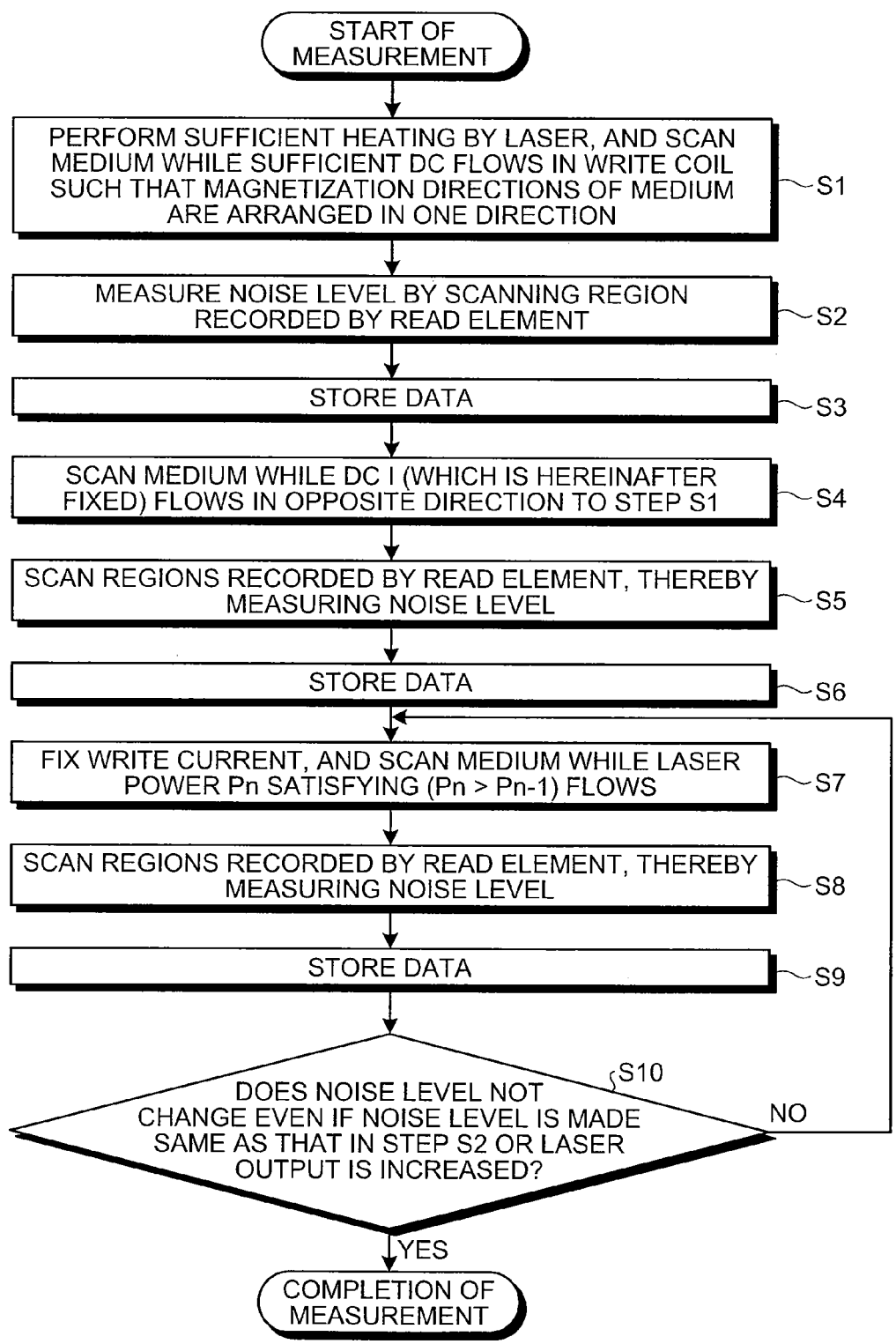

US 8,588,037 B2

MAGNETIC DISK DEVICE, MAGNETIC DISK EVALUATION APPARATUS, AND MAGNETIC HEAD

CROSS-REFERENCE TO RELATED APPLICATIONS

This application is based upon and claims the benefit of priority from Japanese Patent Application No. 2012-002244, filed on Jan. 10, 2012; the entire contents of which are incorporated herein by reference.

FIELD

Embodiments of the present invention relate to a magnetic disk device, a magnetic disk evaluation apparatus, and a magnetic head.

BACKGROUND

As the recording density of a magnetic disk increases, the thermostability of the remanent magnetization of bits recorded in the magnetic disk is reduced. For this reason, a ferromagnetic material improving the intensity of an anisotropy magnetic field is used for a recording layer, whereby the thermostability of the remanent magnetization is improved. Meanwhile, if the ferromagnetic material improving the intensity of the anisotropy magnetic field is used, an increase in the maximum recording magnetic field that a magnetic head can generate cannot keep up, so that the magnetic field is insufficient for magnetic recording.

In order to compensate the insufficiency of the magnetic field necessary for magnetic recording, a thermally assisted magnetic recording system has been proposed. In the thermally assisted magnetic recording system, at the time of recording, a laser beam is irradiated onto a magnetic disk so as to locally heat the magnetic disk, such that the strength of a reversal magnetic field is reduced. In this thermally assisted magnetic recording system, in order to stabilize the quality of a signal, it is important to evaluate a variation of a coercive force at the same temperature in the recording unit of the magnetic disk.

BRIEF DESCRIPTION OF THE DRAWINGS

FIG. 7 is a flow chart illustrating a method of measuring a noise level relative to the intensity of the laser beam of FIG. 6A;

DETAILED DESCRIPTION

A magnetic disk device of an embodiment includes a magnetic disk, a magnetic head, a laser-beam-intensity control unit, a reproduced-signal detecting unit, and a magnetic-disk evaluating unit. The magnetic head reads a signal recorded in the magnetic disk, or performs magnetic recording while irradiating a laser beam onto the magnetic disk. The laser-beam-intensity control unit controls the intensity of the laser beam. The reproduced-signal detecting unit detects the signal read by the magnetic head. The magnetic-disk evaluating unit evaluates the signal read from the magnetic head, on the basis of a relation between a noise level detected from the signal read by the magnetic head, and the intensity of the laser beam.

Hereinafter, a magnetic disk device, a magnetic disk evaluation apparatus, and a magnetic head according to embodiments will be described with reference to the drawings. However, the present invention is not limited by those embodiments.

First Embodiment

Figure 1:
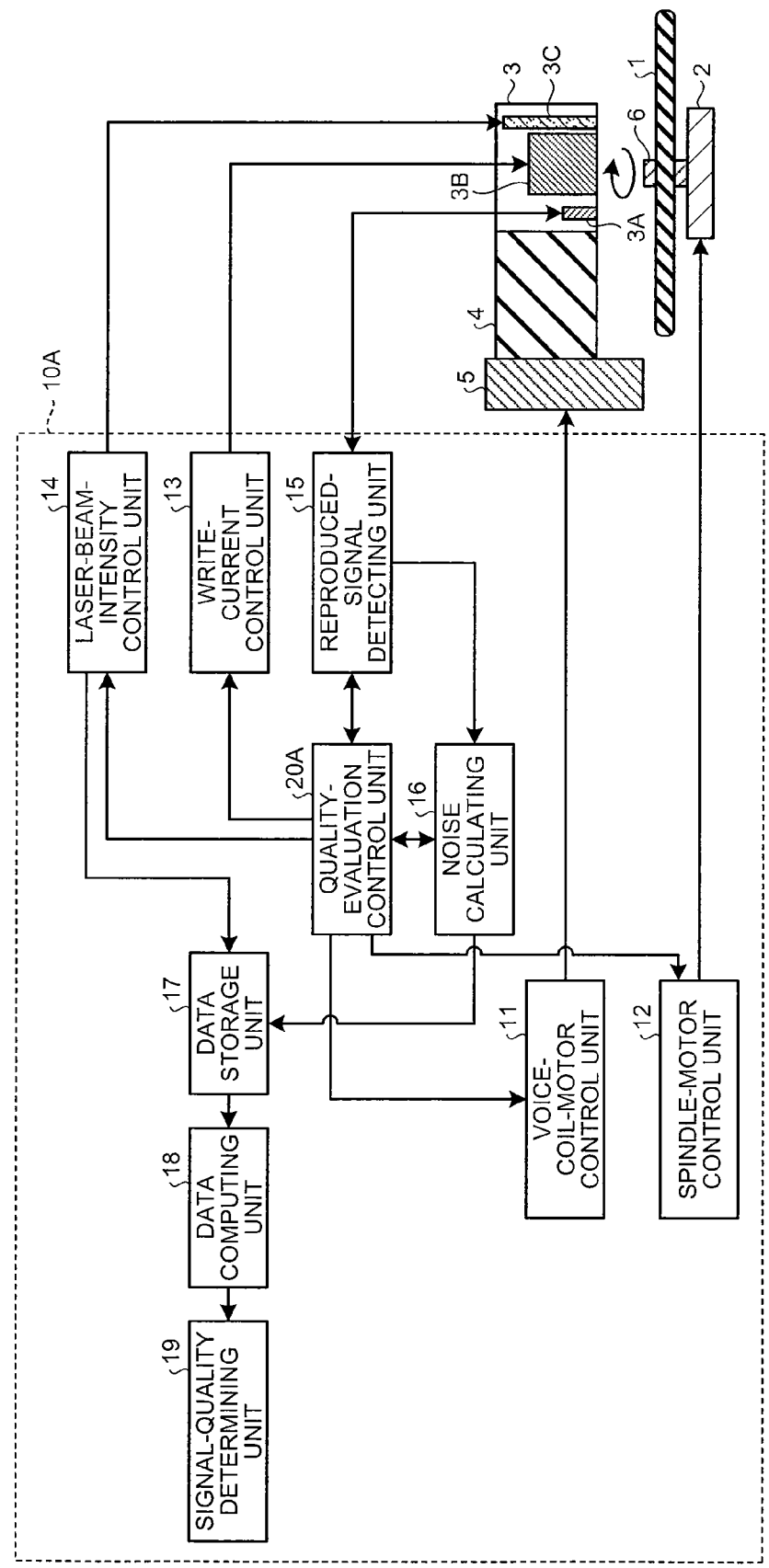
FIG. 1 is a block diagram illustrating a schematic configuration of a magnetic disk evaluation apparatus according to a first embodiment.

FIG. 1 is a block diagram illustrating a schematic configuration of a magnetic disk evaluation apparatus according to a first embodiment.

In FIG. 1, a magnetic disk 1 is supported through a spindle 6, and the spindle 6 is connected to a spindle motor 2. A magnetic head 3 is provided over the magnetic disk 1, and the magnetic head 3 is supported through a slider 4. The slider 4 is connected to a voice coil motor 5 through a suspension and an arm. The magnetic head 3 includes a laser element 3C for irradiating a laser beam onto the magnetic disk 1, a read element 3A for reading a signal recoded in the magnetic disk 1, and a magnetic pole 3B for writing that performs magnetic recording on a laser beam irradiation region on the magnetic disk 1. The magnetic head 3 may include an optical waveguide for guiding a laser beam, instead of the laser element 3C.

A magnetic disk evaluation apparatus 10A includes a voice-coil-motor control unit 11, a spindle-motor control unit 12, a write-current control unit 13, a laser-beam-intensity control unit 14, a reproduced-signal detecting unit 15, a noise calculating unit 16, a data storage unit 17, a data computing unit 18, a signal-quality determining unit 19, and a quality-evaluation control unit 20A.

The magnetic disk evaluation apparatus 10A can evaluate the magnetic disk 1 in the thermally assisted magnetic recording system. The voice-coil-motor control unit 11 can control driving of the voice coil motor 5. The spindle-motor control unit 12 can control rotation of the spindle motor 2. The write-current control unit 13 can control a write current in the thermally assisted magnetic recording. The laser-beam-intensity control unit 14 can control the intensity of a laser beam to be used for the thermally assisted magnetic recording. The reproduced-signal detecting unit 15 can detect a signal read through the read element 3A. The noise calculating unit 16 can calculate a noise level on the basis of the signal read through the read element 3A. The data storage unit 17 can store the noise level calculated by the noise calculating unit 16. The data computing unit 18 can compute a noise distribution relative to the intensity of the laser beam, on the basis of the noise level stored in the data storage unit 17. The signal-quality determining unit 19 can determine the quality of the signal read by the read element 3A, on the basis of a relation between the noise level stored in the data storage unit 17, and the intensity of the laser beam. The quality-evaluation control unit 20A can change the intensity of the laser beam on the basis of the noise level calculated by the noise calculating unit 16.

Further, it is possible to compute the noise distribution relative to the intensity of the laser beam in units of sectors of the magnetic disk 1 while determining the quality of the signal read through the read element 3A in the sector units.

Figure 2A:
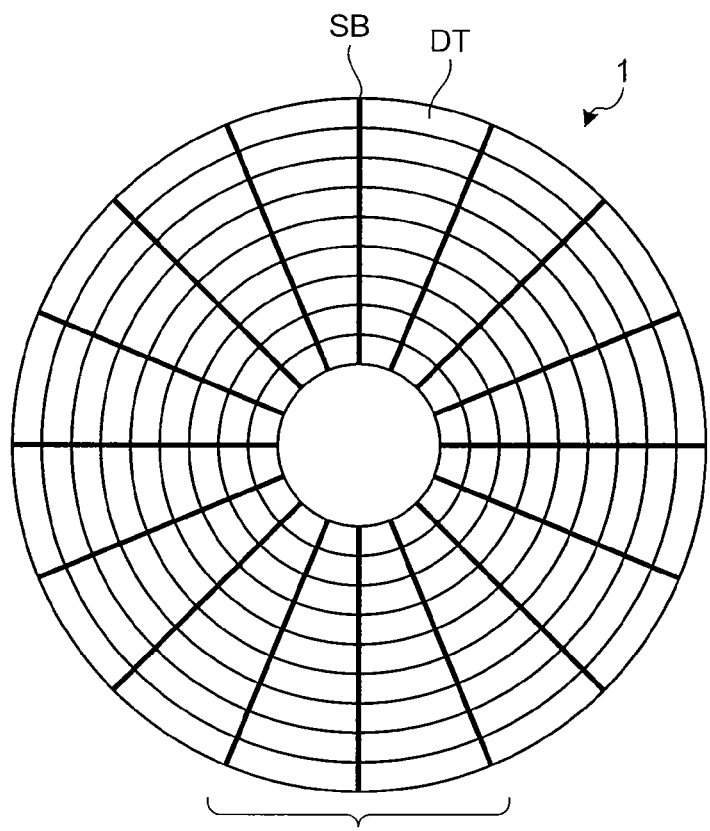
FIG. 2A is a plan view illustrating an example of a configuration of sectors of a magnetic disk 1 of FIG. 1.
Figure 2B:
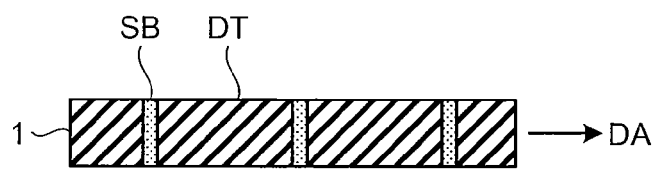
FIG. 2B is an enlarged view of a portion of the magnetic disk 1 of FIG. 2A.

FIG. 2A is a plan view illustrating an example of a configuration of sectors of the magnetic disk 1 of FIG. 1, and FIG. 2B is an enlarged view of a portion of the magnetic disk 1 of FIG. 2A.

In FIGS. 2A and 2B, a disk surface of the magnetic disk 1 is divided by servo regions SB, and data regions DT are disposed between the servo regions SB. Each data region DT is composed of a plurality of sectors.

Here, the evaluation of the magnetic disk evaluation apparatus 10A on the magnetic disk 1 can be performed for each sector recorded in the data regions DT.

Figure 3A:
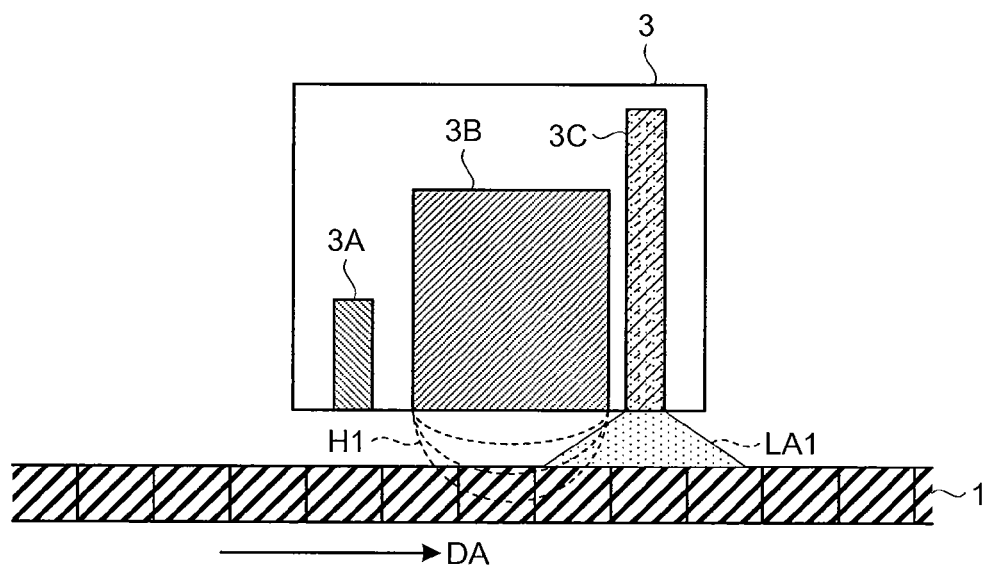
FIG. 3A is a cross-sectional view illustrating a thermally assisted magnetic recording method according to the first embodiment.
Figure 3B:
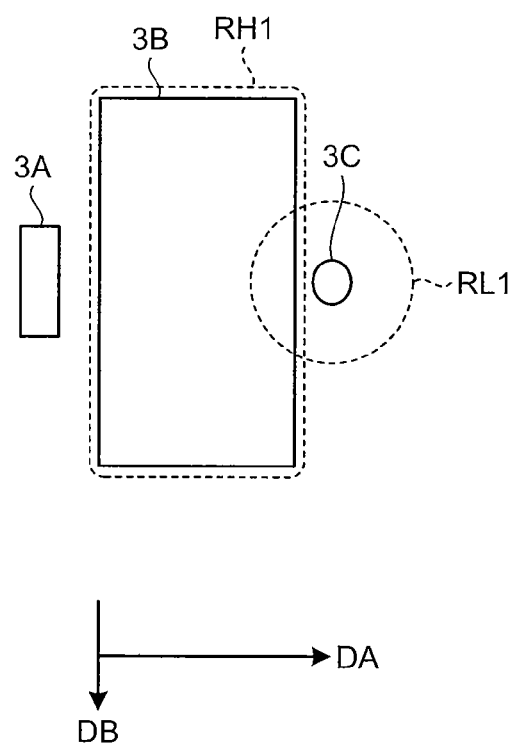
FIG. 3B is a plan view illustrating a relation between a magnetic field region and a heated region in the thermally assisted magnetic recording method of FIG. 3A.

FIG. 3A is a cross-sectional view illustrating a thermally assisted magnetic recording method according to the first embodiment, and FIG. 3B is a plan view illustrating a relation between a magnetic field region and a heated region in the thermally assisted magnetic recording method of FIG. 3A. A reference symbol 'DA' represents a circumferential direction, and a reference 'DB' symbol represents a radial direction.

In FIGS. 3A and 3B, in a case where the magnetic disk evaluation apparatus 10A of FIG. 1 evaluates the quality of a signal that is read from the magnetic disk 1, the quality-evaluation control unit 20A rotates the magnetic disk 1 through the spindle motor 2. Then, a signal is read from the magnetic disk 1 through the read element 3A, and is detected by the reproduced-signal detecting unit 15. Next, the signal detected by the reproduced-signal detecting unit 15 is transmitted to the quality-evaluation control unit 20A, and the voice coil motor 5 is driven on the basis of servo pattern data included in the signal detected by the reproduced-signal detecting unit 15, whereby tracking control on the magnetic head 3 is performed.

The quality-evaluation control unit 20A fixes the write current through the write-current control unit 13, and then controls the intensity of the laser beam through the laser-beam-intensity control unit 14. At this time, the write current flows coil (not drawn) rounded the magnetic pole 3B, such that a magnetic flux H1 is generated around the magnetic pole 3B for writing, and a magnetic field RH1 for writing is generated on the magnetic disk 1. Further, a laser beam LA1 from the laser element 3C is radiated onto the magnetic disk 1, such that an irradiation region RL1 is formed on the magnetic disk 1 and the irradiation region RL1 is heated. If the irradiation region RL1 on the magnetic disk 1 is heated, the coercive force of the irradiation region RL1 is reduced, and thus, at a portion where a magnetic field RH1 for writing overlaps the irradiation region RL1, it is possible to reverse the magnetization direction recorded in the magnetic disk 1. At this time, if there is a variation in the coercive force in each recording region of the magnetic disk 1, a region where magnetization reversal occurs, and a region where magnetization reversal does not occur are formed.

Further, the signal detected by the reproduced-signal detecting unit 15 is transmitted to the noise calculating unit 16, and the noise level is calculated on the basis of the signal detected by the reproduced-signal detecting unit 15 and is stored in the data storage unit 17. Here, whenever the intensity of the laser beam changes with the write current fixed, the quality-evaluation control unit 20A makes the noise calculating unit 16 calculate the noise level, and makes the data storage unit 17 store the noise level for the intensity of the laser beam. At this time, if the intensity of the laser beam increases, since a reduction in the coercive force of the irradiation region RL1 increases, the magnetization reversal easily occurs.

Next, the data computing unit 18 computes the noise distribution relative to the intensity of the laser beam, on the basis of the noise level for the intensity level of the laser beam stored in the data storage unit 17, and transmits the noise distribution to the signal-quality determining unit 19. Then, the signal-quality determining unit 19 determines the quality of the signal read through the read element 3A, on the basis of the noise distribution relative to the intensity of the laser beam.

Figure 4:
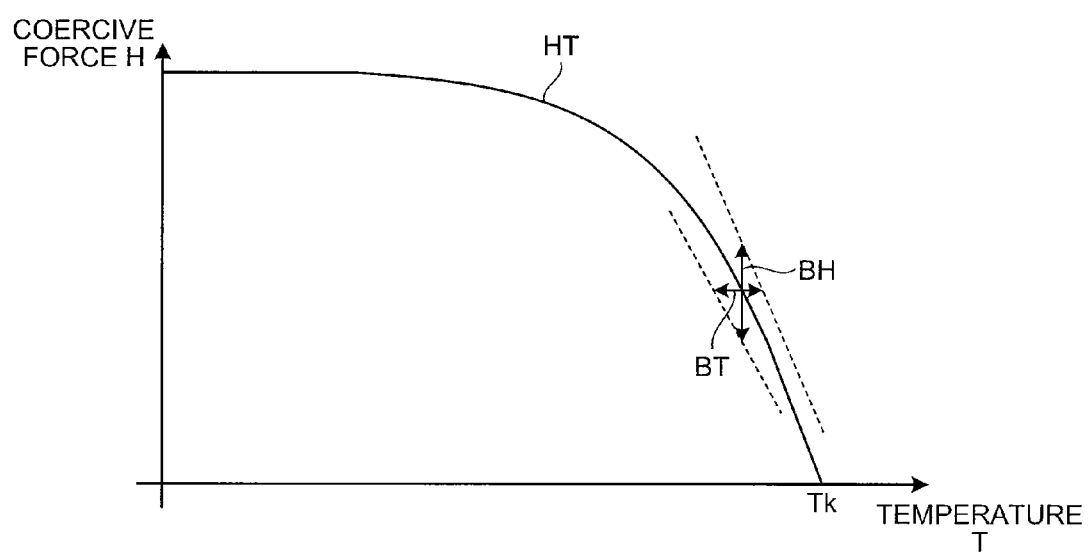
FIG. 4 is a view illustrating a relation between a heating temperature of the magnetic disk 1 of FIG. 1 and a coercive force.

FIG. 4 is a view illustrating a relation between a heating temperature of the magnetic disk 1 of FIG. 1 and a coercive force.

In FIG. 4, the coercive force H of the magnetic disk 1 gradually decreases according to the heating temperature T. Then, at a time point when the heating temperature T reaches the Curie temperature Tk, the magnetic disk 1 loses the coercive force H so as to be a paramagnetic material. At this time, if a feature of a specific recording region of the magnetic disk 1 is denoted by a reference symbol 'HT', actually, a variation in the feature HT occurs in the same magnetic disk 1 due to various factors.

Here, in order to improve the signal quality of recording and reproducing in the thermally assisted magnetic recording (to have a high S/N ratio), the magnetic disk 1 needs features as follow. The first feature is that the reduction sensitivity 'ΔHc/ΔT' of the coercive force H relative to a rise in the heating temperature T is high. The second feature is that a variation BH of the coercive force H relative to the same heating temperature T is small. The third feature is that the variation BT of the heating temperature T resulting in the same coercive force H is small. The fourth feature is that, when a sufficient external magnetic field is applied to the coercive force H, all magnetization directions of the magnetic disk 1 become the same direction (the noise in DC erase is low).

In the configuration of FIG. 1, the third and fourth features of those first to fourth features are evaluated, whereby the signal quality of recording and reproducing in the thermally assisted magnetic recording is evaluated.

Figure 5A:
FIG. 5A is a view illustrating a state when all magnetization directions of the magnetic disk 1 of FIG. 1 are directed to one direction.
Figure 5B:
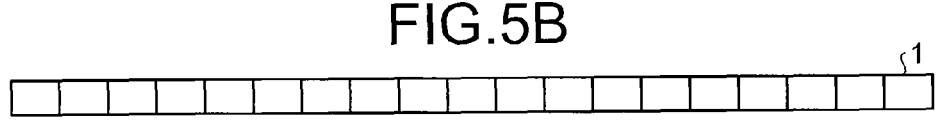
FIG. 5B is a view illustrating a state when all magnetization directions of the magnetic disk 1 of FIG. 1 are directed to the opposite direction to that of FIG. 5A, and FIGS. 5C to 5I are views illustrating changes in the magnetization directions when the intensity of a laser beam gradually increases with a constant write current after DC erase of the magnetic disk 1 is completed.

FIG. 5A is a view illustrating a state when all magnetization directions of the magnetic disk 1 of FIG. 1 are directed to one direction, FIG. 5B is a view illustrating a state when all magnetization directions of the magnetic disk 1 of FIG. 1 are directed to the opposite direction to that of FIG. 5A, and FIGS. 5C to 5I are views illustrating changes in the magnetization directions when the intensity of the laser beam gradually increases while a constant write current flows in the opposite direction to that in the DC erase, after the DC erase on the magnetic disk 1 is completed.

Figure 5C:

In FIGS. 5C to 5I, if it is assumed that the state of FIG. 5A is an ideal state, as shown in FIG. 5C, actually, the state after the DC erase is completed is regarded as an initial state. Then, if the intensity of the laser beam gradually increases to P1 to P6 while a fixed constant write current flows in the opposite direction to that in the DC erase, recording regions where the magnetization reversal occurs increase, and all magnetization directions of the magnetic disk 1 are directed almost in the opposite direction. At this time, according to a reduction of the uniformity of the magnetization directions on the magnetic disk 1, the noise level increases.

Figure 5D:
Figure 5E:
Figure 5F:
Figure 5G:
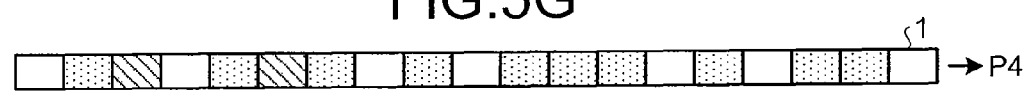
Figure 5H:
Figure 5I:
Figure 6A:
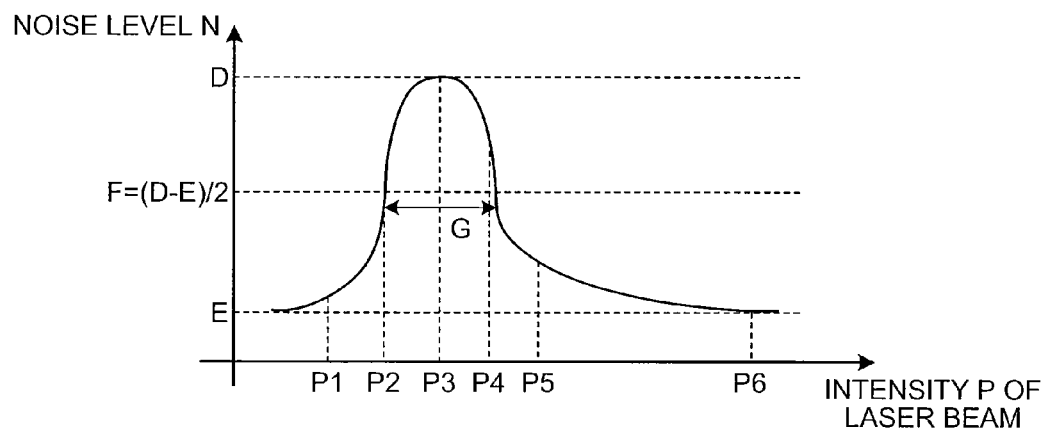
FIG. 6A is a view illustrating a relation between the intensity of the laser beam and a noise level in the FIGS. 5A to 5I.

FIG. 6A is a view illustrating a relation between the intensity of the laser beam and a noise level in the FIGS. 5A to 5I, and FIG. 6B is a view illustrating a relation between a half-value width of FIG. 6A and signal quality.

In FIG. 6A, if the intensity of the laser beam gradually increases to P1 to P4, the non-uniformity of the magnetization directions on the magnetic disk 1 increases, and the noise level N increases. Then, after the noise level N reaches a peak at the intensity P3 of the laser beam, if the intensity of the laser beam gradually increases to P3 to P6, the non-uniformity of the magnetization directions on the magnetic disk 1 decreases, and the noise level N decreases.

If it is assumed that the noise level N becomes a saturation state when the intensity of the laser beam is P6, and the noise level N in the initial state is the same as that in the saturation state, it is possible to set the noise level N in the initial state and the saturation state as a base level E. Further, if the maximum noise level N is set as a peak level D, a half-value width G of the intensity of the laser beam when the noise level N becomes a half F (=(D−E)/2) of a difference between the peak level D and the base level E can be set as a noise distribution.

Figure 6B:
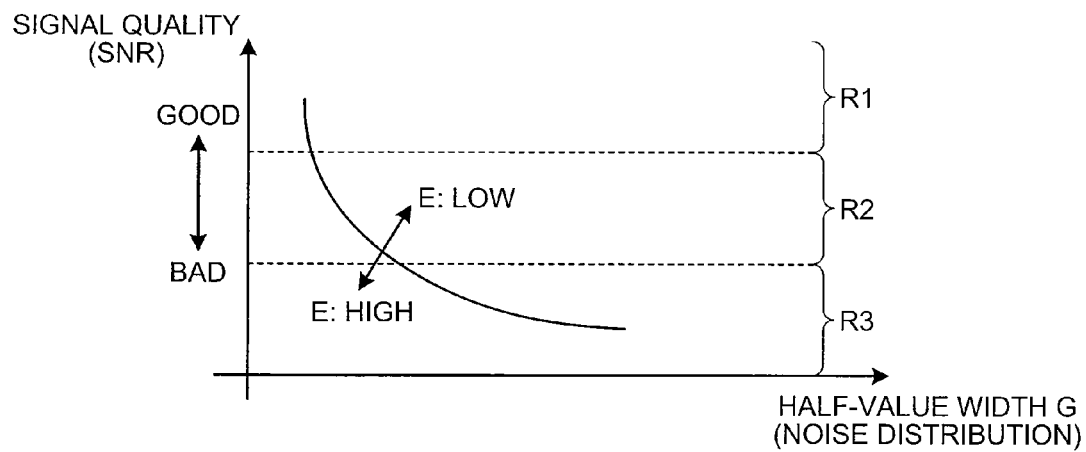
FIG. 6B is a view illustrating a relation between a half-value width of FIG. 6A and signal quality.

Then, as shown in FIG. 6B, according to an increase in the half-value width G, the signal quality SNR is deteriorated. Also, according to an increase in the base level E, the signal quality SNR is deteriorated. Therefore, it is possible to evaluate the quality of the signal read from the magnetic disk 1 by calculating the half-value width G or the base level E.

Further, on the basis of the result of the evaluation on the signal quality SNR, it is possible to divide the recording regions of the magnetic disk 1 into a high-quality region R1, a medium-quality region R2, and a low-quality region R3, for example. Then, the high-quality region R1 may be usable as it is, and the low-quality region R3 may be unusable. Further, the medium-quality region R2 may be subject to an optimizing process, so as to become usable. As the optimizing process, for example, an optimizing process on the intensity of the laser beam or the write current in the thermally assisted magnetic recording can be used.

Therefore, it is possible to evaluate the signal quality on the basis of medium factors, with head factors removed, such that it becomes possible to determine the quality of only a medium, and it is possible to skip an optimizing process according to a combination of a head and a medium.

FIG. 7 is a flow chart illustrating a method of measuring a noise level related to the intensity of the laser beam of FIG. 6A.

In FIG. 7, in STEP S1, the magnetic disk 1 is sufficiently heated by a laser, and then the magnetic disk 1 is scanned by the magnetic pole 3B for writing while a sufficient DC (direct current) flows in the magnetic pole 3B for writing such that the magnetization directions of the magnetic disk 1 are aligned in one direction.

Next, in STEP S2, the magnetic disk 1 having been scanned by the magnetic pole 3B for writing is scanned by the read element 3A, whereby the noise level is measured. Then, in STEP S3, the noise level measured at that time is stored in the data storage unit 17. At this time, if the magnetic disk 1 is an idea medium, as shown in FIG. 5A, all magnetization directions are directed in one direction, such that the noise level at that time becomes 0. However, actually, as shown in FIG. 5C, even if the direct erase is performed, some magnetization directions of the magnetic disk 1 are not arranged such that noise levels exist.

Next, the DC I is fixed to flow in the magnetic pole 3B for writing in the opposite direction to that of STEP S1. Then, in STEP S4, the intensity of the laser beam is set to P1, and the magnetic disk 1 is scanned by the magnetic pole 3B for writing. At this time, as shown in FIG. 5D, the magnetization reversal occurs at a region where the coercive force is week.

Next, in STEP S5, the magnetic disk 1 having been scanned by the magnetic pole 3B for writing is scanned by the read element 3A, whereby the noise level is measured. Then, in STEP S6, the noise level measured at that time is stored in the data storage unit 17. As shown in FIG. 6A, the noise level of STEP S5 increases as compared to the noise level of STEP S2.

Next, in STEP S7, in a state in which the DC I is fixed so as to flow in the magnetic pole 3B for writing in the opposite direction to that in STEP S1, the intensity of the laser beam is set at Pn (n is a positive integer) such that (P>(Pn−1)) is satisfied, and the magnetic disk 1 is scanned by the magnetic pole 3B for writing. At this time, as shown in FIGS. 5E to 5I, as the intensity Pn of the laser beam increases, regions where the magnetization reversal occurs increase.

Next, in STEP S8, the magnetic disk 1 having been scanned by the magnetic pole 3B for writing is scanned by the read element 3A, such that the noise level is measured. Then, in STEP S9, the noise level measured at that time is stored in the data storage unit 17 for each intensity Pn of the laser beam.

Next, if it is determined in STEP S10 whether the noise level does not change even if the noise level is made same as the noise level of STEP S2 or the intensity Pn of the laser beam is increased. Then, if the result of STEP S10 is positive, the measurement process returns to STEP S7, and the processes of STEPS S7 to S10 are repeated. The above-mentioned processes can be performed only on the data regions DT of FIG. 2A.

Second Embodiment

Figure 8:
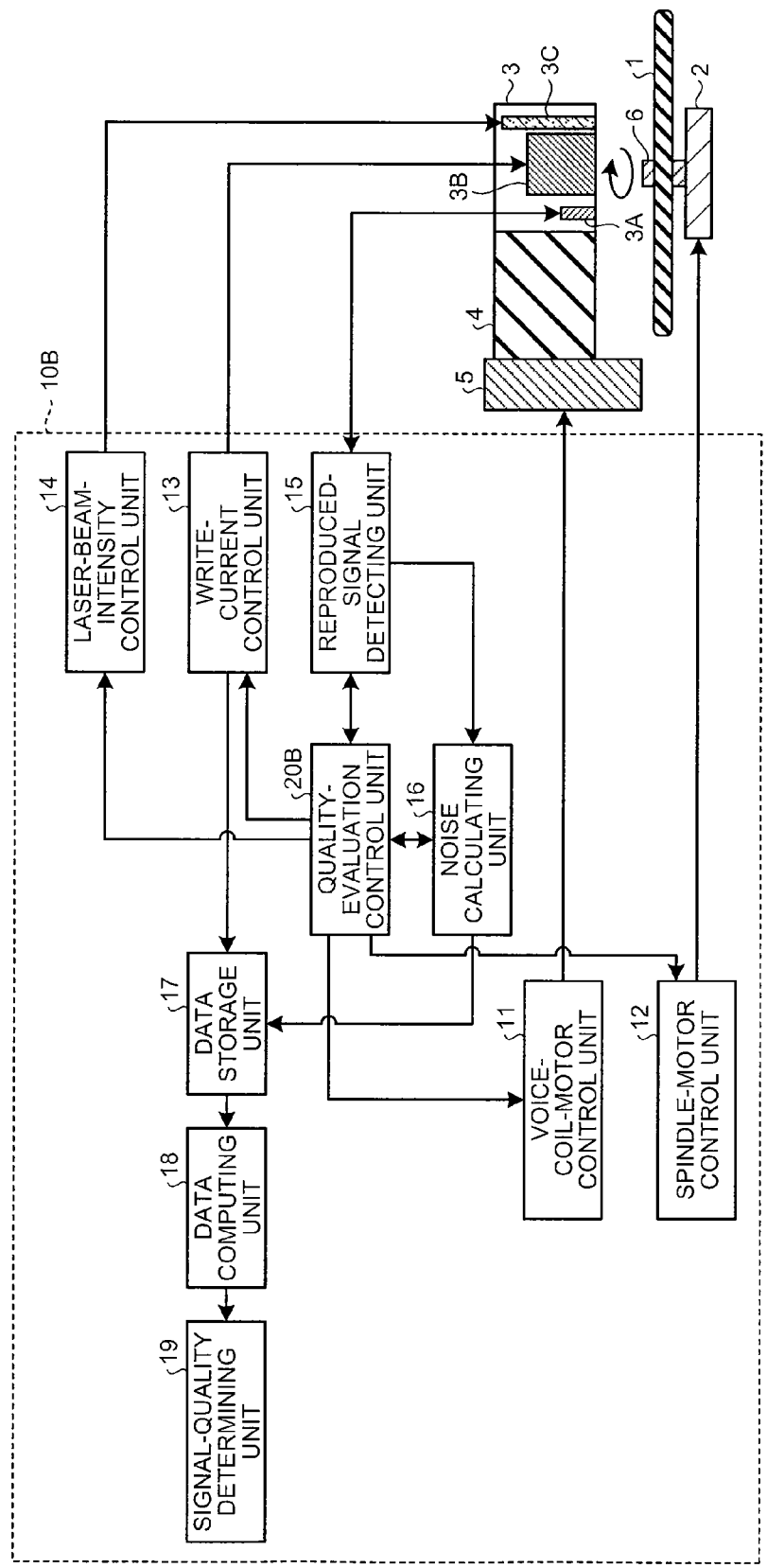
FIG. 8 is a block diagram illustrating a schematic configuration of a magnetic disk evaluation apparatus according to a second embodiment.

FIG. 8 is a block diagram illustrating a schematic configuration of a magnetic disk evaluation apparatus according to a second embodiment.

In FIG. 8, the magnetic disk evaluation apparatus includes a magnetic disk evaluation apparatus 10B, instead of the magnetic disk evaluation apparatus 10A of FIG. 1. The magnetic disk evaluation apparatus 10B includes a quality-evaluation control unit 20B, instead of the quality-evaluation control unit 20A of FIG. 1. The quality-evaluation control unit 20B can change the current value of the write current on the basis of the noise level calculated by the noise calculating unit 16.

In the configuration of FIG. 8, the second and fourth features of the first to fourth features required for the above-mentioned magnetic disk 1 are evaluated, whereby the signal quality of recording and reproducing in the thermally assisted magnetic recording is evaluated.

Then, in a case where the magnetic disk evaluation apparatus 10B evaluates the quality of the signal read from the magnetic disk 1, the quality-evaluation control unit 20B rotates the magnetic disk 1 through the spindle motor 2. Next, the signal is read from the magnetic disk 1 through the read element 3A, and is detected by the reproduced-signal detecting unit 15. Then, the signal detected by the reproduced-signal detecting unit 15 is transmitted to the quality-evaluation control unit 20B, and the voice coil motor 5 is driven on the basis of the servo pattern data included in the signal detected by the reproduced-signal detecting unit 15, whereby the tracking control is performed on the magnetic head 3.

The quality-evaluation control unit 20B makes the write-current control unit 13 control the current value of the write current in a state in which the intensity of the laser beam is fixed through the laser-beam-intensity control unit 14. Next, a laser beam A1 from the laser element 3C is radiated onto the magnetic disk 1, whereby the irradiation region RL1 on the magnetic disk 1 is heated. At this time, the write current flows coil (not drawn) rounded the magnetic pole 3B, such that the magnetic field RH1 for writing is formed on the magnetic disk 1. Then, at a portion where the magnetic field RH1 for writhing overlaps the irradiation region RL1, the magnetization directions are reversed in accordance with the coercive force of each recording region of the magnetic disk 1.

The signal detected by the reproduced-signal detecting unit 15 is also transmitted to the noise calculating unit 16, such that the noise level is calculated on the basis of the signal detected by the reproduced-signal detecting unit 15 and is store in the data storage unit 17. Here, the quality-evaluation control unit 20B makes the noise calculating unit 16 calculate the noise level whenever the current value of the write current is changed with the intensity of the laser beam fixed, and makes the data storage unit 17 store the noise level for the current value of the write current.

Next, the data computing unit 18 computes the noise distribution relative to the current value of the write current, on the basis of the noise level for the current value of the write current stored in the data storage unit 17, and transmits the noise distribution to the signal-quality determining unit 19. Then, the signal-quality determining unit 19 determines the quality of the signal read through the read element 3A, on the basis of the noise distribution relative to the current value of the write current.

It is possible to determine the quality of the signal read through the read element 3A in units of sectors while computing the noise distribution relative to the current value of the write current in units of the sectors of the magnetic disk 1.

Figure 9:
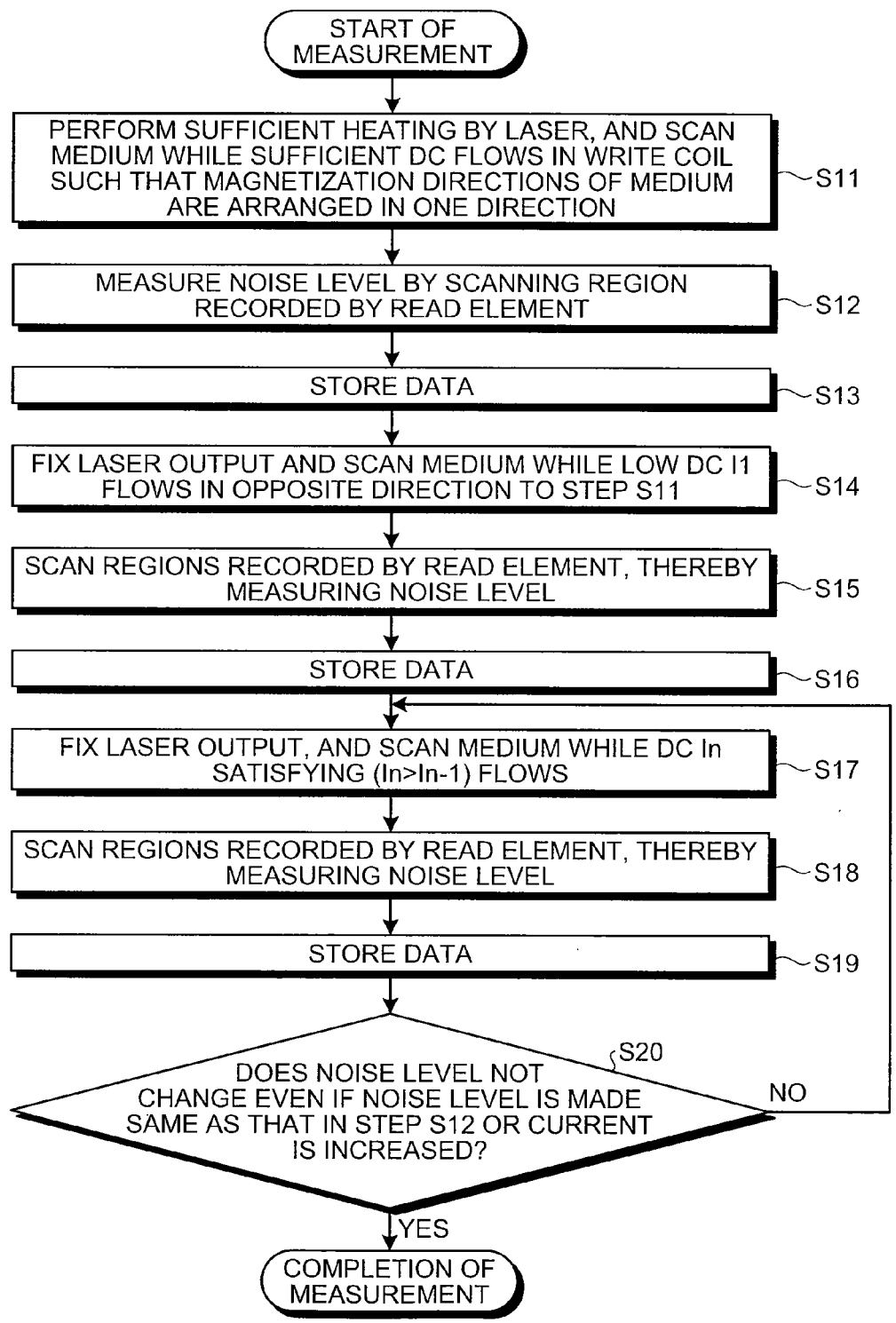
FIG. 9 is a flow chart illustrating a method of measuring a noise level relative to a write current in the magnetic disk evaluation apparatus of FIG. 8.

FIG. 9 is a flow chart illustrating a method of measuring a noise level related to a write current in the magnetic disk evaluation apparatus of FIG. 8.

In FIG. 9, in STEP S11, the magnetic disk 1 is sufficiently heated by a laser, and then the magnetic disk 1 is scanned by the magnetic pole 3B for writing while a sufficient DC (direct current) flows in the magnetic pole 3B for writing such that the magnetization directions of the magnetic disk 1 are aligned in one direction.

Next, in STEP S12, the magnetic disk 1 having been scanned by the magnetic pole 3B for writing is scanned by the read element 3A, whereby the noise level is measured. Then, in STEP S13, the noise level measured at that time is stored in the data storage unit 17.

Next, the intensity of the laser beam is fixed. Then, in STEP S14, the current value of the write current I is set such that the write current flows coil (not drawn) rounded the magnetic pole 3B in the opposite direction to that in STEP S11, and the magnetic disk 1 is scanned by the magnetic pole 3B for writing. At this time, at the regions where the coercive force is week, the magnetization reversal occurs.

Next, in STEP S15, the magnetic disk 1 having been scanned by the magnetic pole 3B for writing is scanned by the read element 3A, whereby the noise level is measured. Then, in STEP S16, the noise level measured at that time is stored in the data storage unit 17. Further, the noise level of STEP S15 increases as compared to the noise level of STEP S12.

Next, in STEP 17, the current value of the write current I is set at In with the intensity of the laser beam fixed such that $(I > (In-1))$ is satisfied, and the magnetic disk 1 is scanned by the magnetic pole 3B for writing. At this time, as the current value of the write current I increases, the regions where the magnetization reversal occurs increase.

Next, in STEP S18, the magnetic disk 1 having been scanned by the magnetic pole 3B for writing is scanned by the read element 3A, such that the noise level is measured. Then, in STEP S19, the noise level measured at that time is stored for each current value In of the write current I.

Next, if it is determined in STEP S20 whether the noise level does not change even if the noise level is made same as the noise level of STEP S12 or the current value In of the write current I is increased. Then, if the result of STEP S20 is positive, the measurement process returns to STEP S17, and the processes of STEPS S17 to S20 are repeated. The above-mentioned processes can be performed only on the data regions DT of FIG. 2A.

Third Embodiment

Figure 10:
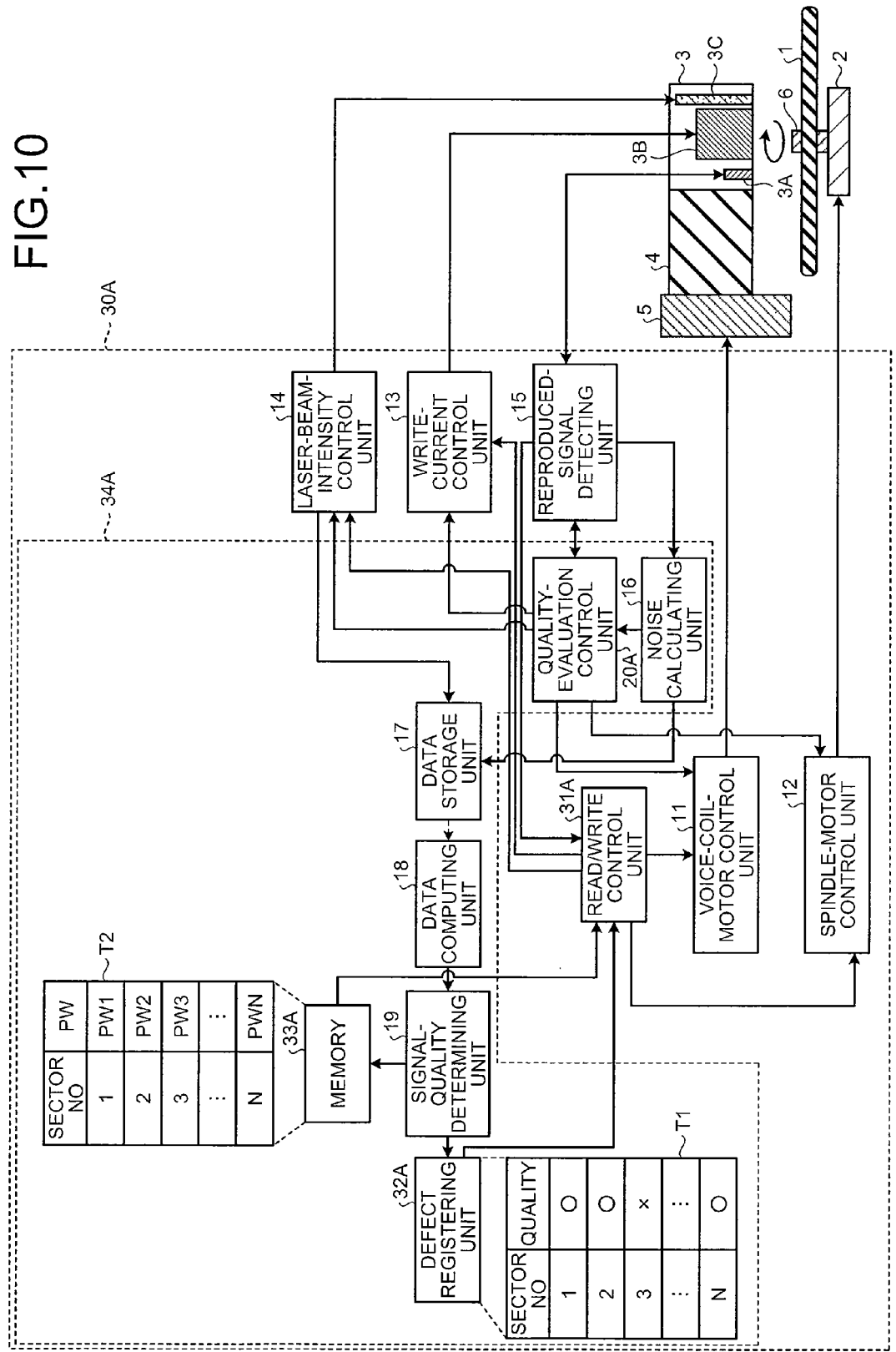
FIG. 10 is a block diagram illustrating a schematic configuration of a magnetic disk device according to a third embodiment.

FIG. 10 is a block diagram illustrating a schematic configuration of a magnetic disk device according to a third embodiment.

In FIG. 10, the magnetic disk device includes a magnetic disk 1, a spindle motor 2, a magnetic head 3, a slider 4, a voice coil motor 5, a spindle 6, and a magnetic-disk control unit 30A. The magnetic disk 1 is supported through the spindle 6, and the spindle 6 is connected to the spindle motor 2. A magnetic head 3 is provided over the magnetic disk 1, and the magnetic head 3 is supported through the slider 4. The voice coil motor 5 is connected to the slider 4. The magnetic head 3 includes a laser element 3C, a read element 3A, and a magnetic pole 3B for writing.

The magnetic-disk control unit 30A includes a voice-coil-motor control unit 11, a spindle-motor control unit 12, a write-current control unit 13, a laser-beam-intensity control unit 14, a reproduced-signal detecting unit 15, a read/write control unit 31A, and a magnetic-disk evaluation unit 34A.

The magnetic-disk evaluation unit 34A includes a noise calculating unit 16, a data storage unit 17, a data computing unit 18, a signal-quality determining unit 19, a quality-evaluation control unit 20A, a defect registering unit 32A, and a memory 33A. The defect registering unit 32A includes a table T1, and the memory 33A includes a table T2.

Hereinafter, portions different from the configuration of FIG. 1 will be described. In other words, the magnetic-disk control unit 30A can perform recording, reproducing, and evaluation on the magnetic disk 1 in the thermally assisted magnetic recording system. The read/write control unit 31A can control recording and reproducing on the magnetic disk 1 in the thermally assisted magnetic recording system. The magnetic-disk evaluation unit 34A can evaluate the magnetic disk 1 in the thermally assisted magnetic recording system. The defect registering unit 32A can perform defect registration in units of sectors on the basis of the result of the signal-quality determination of the signal-quality determining unit 19. In the table T1, a relation between sector numbers 1 to N (N is a positive integer) and whether the signal quality is good or bad can be registered. Here, in the example of the table T1 of FIG. 10, the sector number of the high-quality region R1 of FIG. 6B is marked with ○, and the sector number of the low-quality region R3 is marked with x. The memory 33A can store the intensity of the laser beam in the thermally assisted magnetic recording, in units of sectors. In the table T2, a relation between the sector numbers 1 to N and the intensity PW of the laser beam can be registered. Here, in an example of the table T2 of FIG. 10, the laser beam intensities PW1 to PWN are shown for the sector numbers 1 to N of the medium-quality region R2 of FIG. 6B.

Further, in a case of evaluating the signal read from the magnetic disk 1 by the magnetic disk device of FIG. 10, servo pattern data is written in the magnetic disk 1 by a dedicated servo writer in advance before product shipment. In a case where the magnetic disk device has a self servo writing function, the servo pattern data may be written in the magnetic disk 1 in advance by the self servo writing function.

The quality-evaluation control unit 20A rotates the magnetic disk 1 through the spindle motor 2. Then, a signal is read from the magnetic disk 1 through the read element 3A, and is detected by the reproduced-signal detecting unit 15. Next, the signal detected by the reproduced-signal detecting unit 15 is transmitted to the quality-evaluation control unit 20A, and the voice coil motor 5 is driven on the basis of servo pattern data included in the signal detected by the reproduced-signal detecting unit 15, whereby tracking control on the magnetic head 3 is performed.

The quality-evaluation control unit 20A fixes the write current through the write-current control unit 13, and then controls the intensity of the laser beam through the laser-beam-intensity control unit 14. Further, a laser beam LA1 from the laser element 3C is radiated onto the magnetic disk 1, such that the irradiation region RL on the magnetic disk 1 is heated. At this time, the write current flows coil (not drawn) rounded the magnetic pole 3B such that a magnetic field RH1 for writing is formed on the magnetic disk 1. Then, at a region where the magnetic field RH1 for writing overlaps the irradiation region RL1, the magnetization direction is reversed in accordance with the coercive force of each recording region of the magnetic disk 1.

Further, the signal detected by the reproduced-signal detecting unit 15 is transmitted to the noise calculating unit 16, and the noise level is calculated on the basis of the signal detected by the reproduced-signal detecting unit 15 and is stored in the data storage unit 17. Here, whenever changing the intensity of the laser beam with the write current fixed, the quality-evaluation control unit 20A makes the noise calculating unit 16 calculate the noise level, and makes the data storage unit 17 store the noise level for the intensity of the laser beam.

Next, the data computing unit 18 computes the noise distribution relative to the intensity of the laser beam, on the basis of the noise level for the intensity of the laser beam stored in the data storage unit 17, and transmits the noise distribution to the signal-quality determining unit 19. Then, the signal-quality determining unit 19 determines the quality of the signal read through the read element 3A, on the basis of the noise distribution relative to the intensity of the laser beam.

Further, on the basis of the result of the evaluation on the signal quality SNR, the signal-quality determining unit 19 can divide the recording regions of the magnetic disk 1 into the high-quality region R1, the medium-quality region R2, and the low-quality region R3 in units of sectors, for example, as shown in FIG. 6B. The defect registering unit 32A registers the usable high-quality region R1 in units of sectors in the table T1, and registers the unusable low-quality region R3 in units of sectors in the table T1. Further, the signal-quality determining unit 19 registers the laser beam intensity after the optimizing process in units of sectors for the medium-quality region R2 in the table T2.

Meanwhile, in a case where the magnetic disk device of FIG. 10 performs magnetic recording on the magnetic disk 1, the read/write control unit 31A rotates the magnetic disk 1 through the spindle motor 2. Then, referring the table T1 with respect to a sector to be subject to the magnetic recording, it is checked whether the sector is usable. In a case where the sector is usable, the magnetic head 3 is sought at the sector, and magnetic recording is performed on the sector. Meanwhile, in a case where the sector to be subject to the magnetic recording is unusable, the table T1 is searched to determine a usable sector. Then, the magnetic head 3 is sought at the sector, whereby the magnetic recording is performed on the sector.

Meanwhile, in a case of performing an optimizing process in the magnetic recording on the magnetic disk 1, referring to the table T2 with respect to a sector to be subject to the magnetic recording, the laser beam intensity for the sector is checked. Then, the read/write control unit 31A seeks the magnetic head 3 at the sector, sets the laser beam intensity for the sector to the value designated in the table T2, and performs the magnetic recording on the sector.

Figure 11:
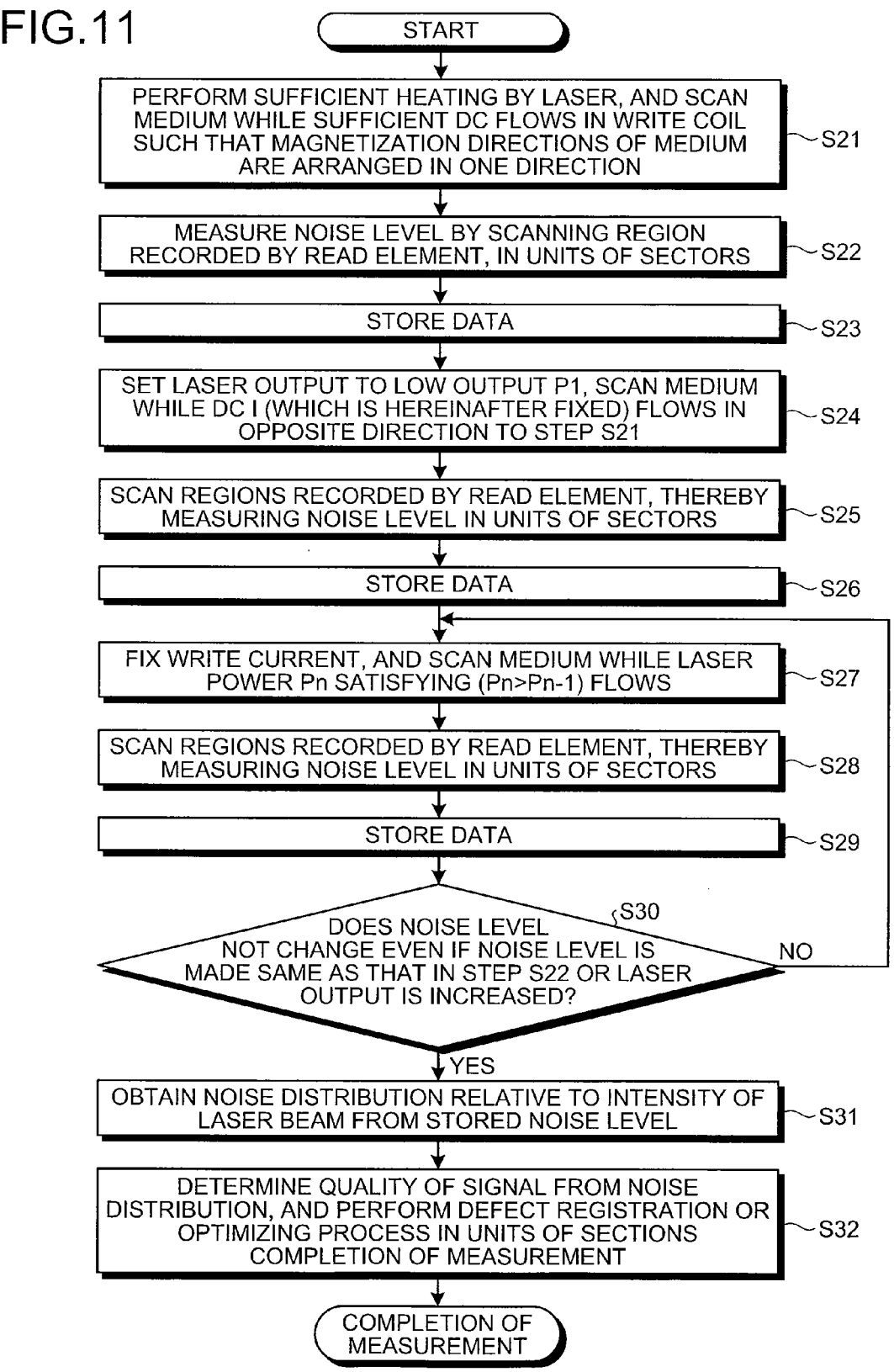
FIG. 11 is a flow chart illustrating a quality evaluating process in the magnetic disk device of FIG. 10.

FIG. 11 is a flow chart illustrating a quality evaluating process in the magnetic disk device of FIG. 10.

In FIG. 11, in STEP S21, the magnetic disk 1 is sufficiently heated by a laser, and then the magnetic disk 1 is scanned by the magnetic pole 3B for writing while a sufficient DC (direct current) flows in the magnetic pole 3B for writing such that the magnetization directions of the data regions DT of the magnetic disk 1 are aligned in one direction.

Next, in STEP S22, the magnetic disk 1 having been scanned by the magnetic pole 3B for writing is scanned by the read element 3A, whereby the noise level is measured in units of sectors. Then, in STEP S23, the noise level measured at that time is stored in units of sectors in the data storage unit 17.

Next, the DC I is fixed to flow in the magnetic pole 3B for writing in the opposite direction to that in STEP S21. Then, in STEP S24, the laser beam intensity is set to P1, and the magnetic disk 1 is scanned by the magnetic pole 3B for writing.

Next, in STEP S25, the magnetic disk 1 having been scanned by the magnetic pole 3B for writing is scanned by the read element 3A, whereby the noise level is measured in units of sectors. Then, in STEP S26, the noise level measured at that time is stored in units of sectors in the data storage unit 17.

Next, in STEP S27, in a state in which the DC I is fixed so as to flow in the magnetic pole 3B for writing in the opposite direction to that in STEP S21, the intensity of the laser beam is set at Pn such that (P>(Pn−1)) is satisfied, and the magnetic disk 1 is scanned by the magnetic pole 3B for writing.

Next, in STEP S28, the magnetic disk 1 having been scanned by the magnetic pole 3B for writing is scanned by the read element 3A, whereby the noise level is measured in units of sectors. Then, in STEP S29, the noise level measured at that time is stored for the laser beam intensity Pn in units of sectors in the data storage unit 17.

Next, if it is determined in STEP S30 whether the noise level does not change even if the noise level is made same as the noise level of STEP S22 or the intensity Pn of the laser beam is increased. Then, if the result of STEP S30 is positive, the measurement process returns to STEP S27, and the processes of STEPS S27 to S30 are repeated.

Next, in STEP S31, the noise distribution relative to the intensity of the laser beam is obtained in units of sectors on the basis of the noise level for the intensity level of the laser beam stored in the data storage unit 17.

Next, the quality of the signal read by the read element 3A is determined in units of sectors on the basis of the noise distribution relative to the intensity of the laser beam. Then, in STEP S32, defect registration or an optimizing process is performed in units of sectors on the basis of the result of the determination of the signal quality SNR.

Fourth Embodiment

Figure 12:
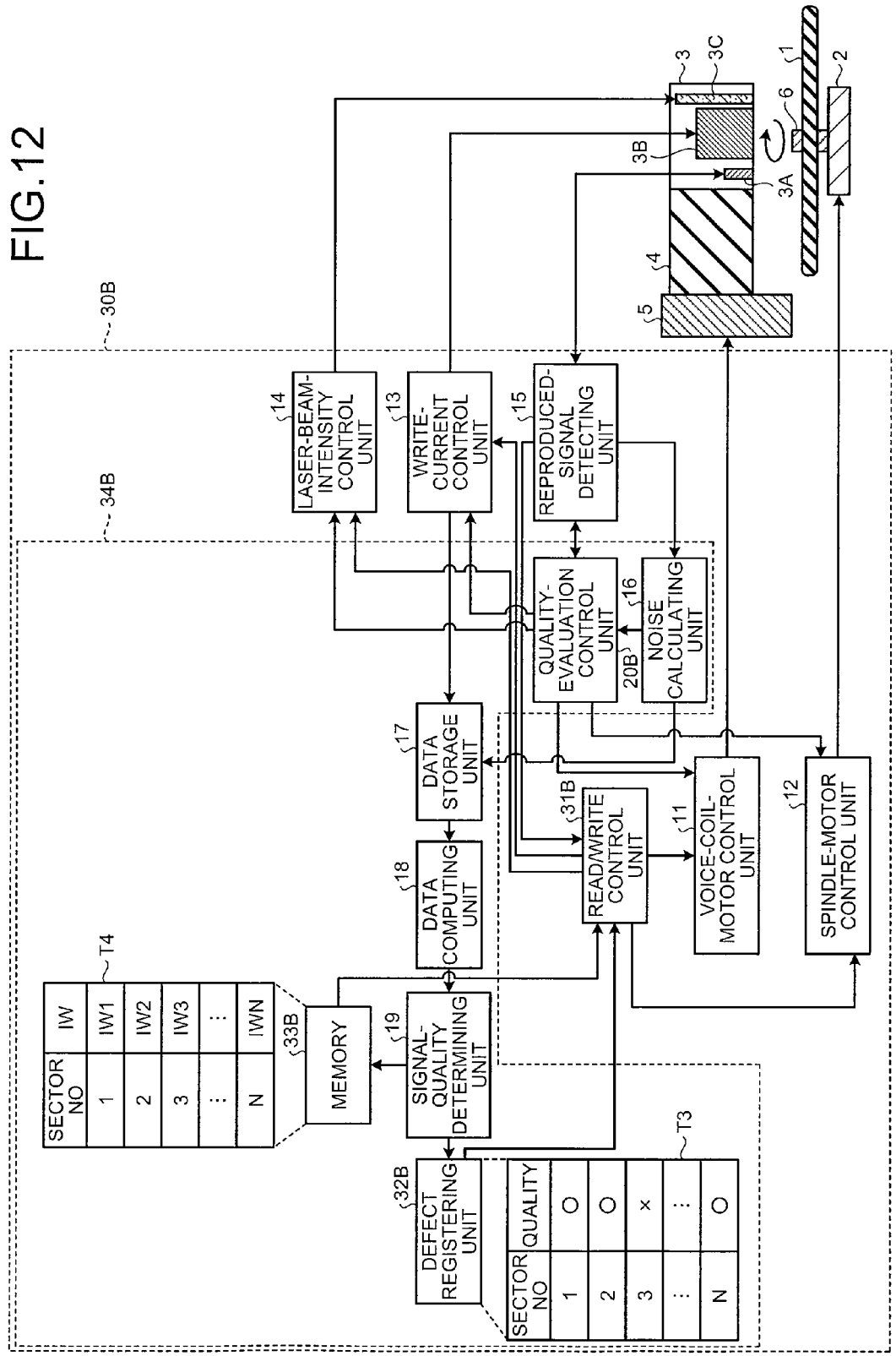
FIG. 12 is a block diagram illustrating a schematic configuration of a magnetic disk device according to a fourth embodiment.

FIG. 12 is a block diagram illustrating a schematic configuration of a magnetic disk device according to a fourth embodiment.

In FIG. 12, the magnetic disk device includes a magnetic disk 1, a spindle motor 2, a magnetic head 3, a slider 4, a voice coil motor 5, a spindle 6, and a magnetic-disk control unit 30B. The magnetic head 3 includes a laser element 3C, a read element 3A, and a magnetic pole 3B for writing.

The magnetic-disk control unit 30B includes a voice-coil-motor control unit 11, a spindle-motor control unit 12, a write-current control unit 13, a laser-beam-intensity control unit 14, a reproduced-signal detecting unit 15, a read/write control unit 31B, and a magnetic-disk evaluation unit 34B.

The magnetic-disk evaluation unit 34B includes a noise calculating unit 16, a data storage unit 17, a data computing unit 18, a signal-quality determining unit 19, a quality-evaluation control unit 20B, a defect registering unit 32B, and a memory 33B. The defect registering unit 32B includes a table T3, and the memory 33B includes a table T4.

Hereinafter, portions different from the configuration of FIG. 8 will be described. In other words, the magnetic-disk control unit 30B can perform recording, reproducing, and evaluation on the magnetic disk 1 in the thermally assisted magnetic recording system. The read/write control unit 31B can control recording and reproducing on the magnetic disk 1 in the thermally assisted magnetic recording system. The magnetic-disk evaluation unit 34B can evaluate the magnetic disk 1 in the thermally assisted magnetic recording system. The defect registering unit 32B can perform defect registration in units of sectors on the basis of the result of the signal-quality determination of the signal-quality determining unit 19. In the table T3, a relation between sector numbers 1 to N (N is a positive integer) and whether the signal quality is good or bad can be registered. Here, in the example of the table T3 of FIG. 12, the sector number of the high-quality region R1 of FIG. 6B is marked with ○, and the sector number of the low-quality region R3 is marked with x. The memory 33B can store the current value of the write current in the thermally assisted magnetic recording, in units of sectors. In the table T4, a relation between the sector numbers 1 to N and the current value IW of the write current can be registered. Here, in an example of the table T4 of FIG. 12, the current values IW1 to IWN of the write current are shown for the sector numbers 1 to N of the medium-quality region R2 of FIG. 6B.

Further, in a case of evaluating the signal read from the magnetic disk 1 by the magnetic disk device of FIG. 12, servo pattern data is written in the magnetic disk 1 by a dedicated servo writer in advance before product shipment. In a case where the magnetic disk device has a self servo writing function, the servo pattern data may be written in the magnetic disk 1 in advance by the self servo writing function.

The quality-evaluation control unit 20B rotates the magnetic disk 1 through the spindle motor 2. Then, a signal is read from the magnetic disk 1 through the read element 3A, and is detected by the reproduced-signal detecting unit 15. Next, the signal detected by the reproduced-signal detecting unit 15 is transmitted to the quality-evaluation control unit 20B, and the voice coil motor 5 is driven on the basis of servo pattern data included in the signal detected by the reproduced-signal detecting unit 15, whereby tracking control on the magnetic head 3 is performed.

The quality-evaluation control unit 20B fixes the intensity of the laser beam through the laser-beam-intensity control unit 14, and then controls the current value of the write current through the write-current control unit 13. Further, a laser beam LA1 from the laser element 3C is radiated onto the magnetic disk 1, such that the irradiation region RL1 on the magnetic disk 1 is heated. At this time, the write current flows coil (not drawn) rounded the magnetic pole 3B such that a magnetic field RH1 for writing is formed on the magnetic disk 1. Then, at a region where the magnetic field RH1 for writing overlaps the irradiation region RL1, the magnetization direction is reversed in accordance with the coercive force of each recording region of the magnetic disk 1.

Further, the signal detected by the reproduced-signal detecting unit 15 is transmitted to the noise calculating unit 16, and the noise level is calculated on the basis of the signal detected by the reproduced-signal detecting unit 15 and is stored in the data storage unit 17. Here, whenever changing the current value of the write current with the intensity of the laser beam fixed, the quality-evaluation control unit 20B makes the noise calculating unit 16 calculate the noise level, and makes the data storage unit 17 store the noise level for the current value of the write current.

Next, the data computing unit 18 computes the noise distribution relative to the current value of the write current, on the basis of the noise level for the current value of the write current stored in the data storage unit 17, and transmits the noise distribution to the signal-quality determining unit 19. Then, the signal-quality determining unit 19 determines the quality of the signal read through the read element 3A, on the basis of the noise distribution relative to current value of the write current.

Further, on the basis of the result of the evaluation on the signal quality SNR, the signal-quality determining unit 19 can divide the recording regions of the magnetic disk 1 into the high-quality region R1, the medium-quality region R2, and the low-quality region R3 in units of sectors, for example, as shown in FIG. 6B. The defect registering unit 32B registers the usable high-quality region R1 in units of sectors in the table T3, and registers the unusable low-quality region R3 in units of sectors in the table T3. Further, the signal-quality determining unit 19 registers the current value of the write current after the optimizing process in units of sectors for the medium-quality region R2 in the table T4.

Meanwhile, in a case where the magnetic disk device of FIG. 12 performs magnetic recording on the magnetic disk 1, the read/write control unit 31B rotates the magnetic disk 1 through the spindle motor 2. Then, referring the table T3 with respect to a sector to be subject to the magnetic recording, it is checked whether that sector is usable. In a case where the sector is usable, the magnetic head 3 is sought at the sector, and magnetic recording is performed on the sector. Meanwhile, in a case where the sector to be subject to the magnetic recording is unusable, the table T3 is searched to determine a usable sector. Then, the magnetic head 3 is sought at the sector, whereby the magnetic recording is performed on the sector.

Meanwhile, in a case of performing an optimizing process in the magnetic recording on the magnetic disk 1, referring to the table T4 with respect to a sector to be subject to the magnetic recording, the current value of the write current for the sector is checked. Then, the read/write control unit 31B seeks the magnetic head 3 at the sector, sets the current value of the write current for the sector to the value designated in the table T4, and performs the magnetic recording on the sector.

Figure 13:
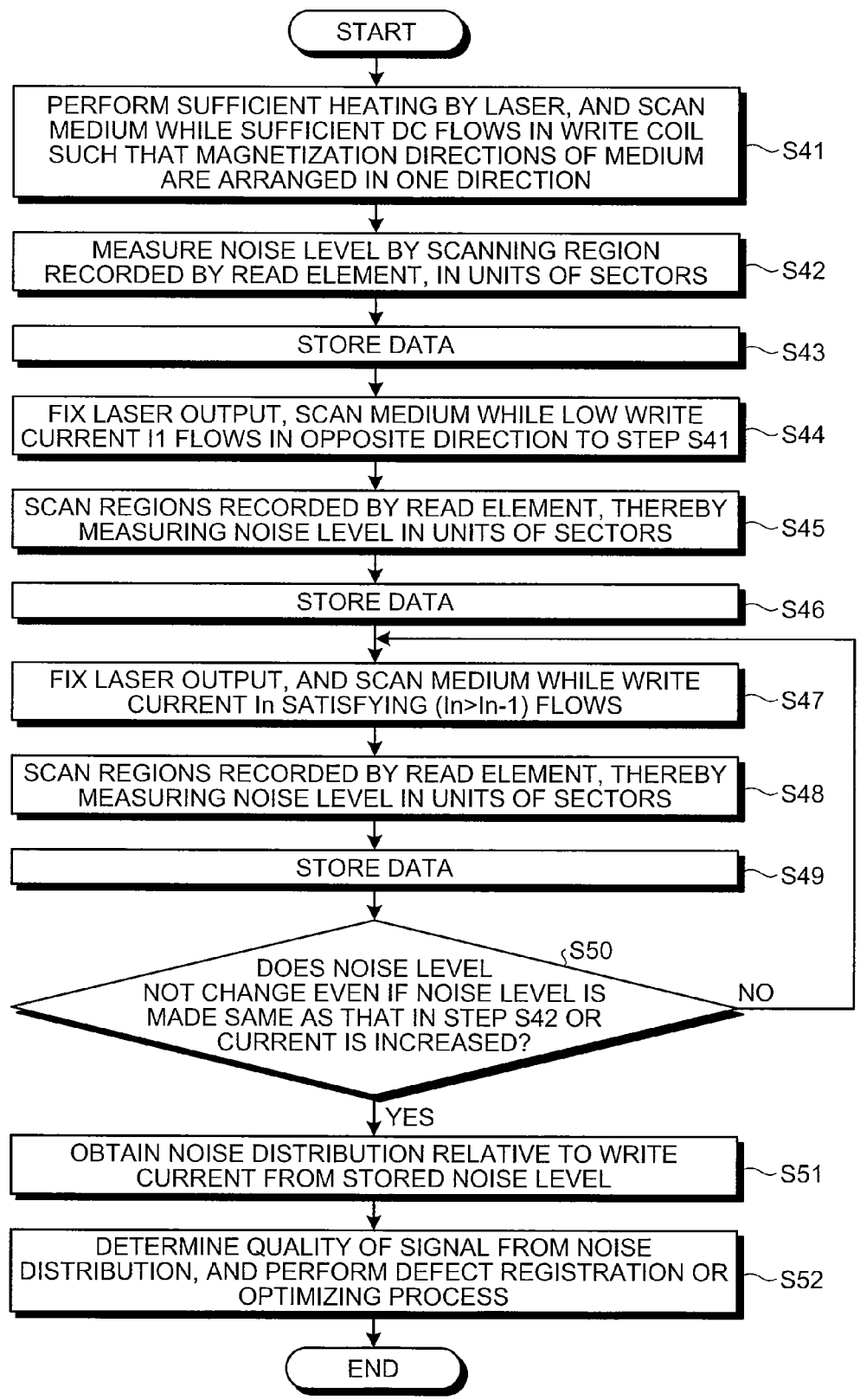
FIG. 13 is a flow chart illustrating a quality evaluating process in the magnetic disk device of FIG. 12.

FIG. 13 is a flow chart illustrating a quality evaluating process in the magnetic disk device of FIG. 12.

In FIG. 13, in STEP S41, the magnetic disk 1 is sufficiently heated by a laser, and then the magnetic disk 1 is scanned by the magnetic pole 3B for writing while a sufficient DC (direct current) flows in the magnetic pole 3B for writing such that the magnetization directions of the data regions DT of the magnetic disk 1 are aligned in one direction.

Next, in STEP S42, the magnetic disk 1 having been scanned by the magnetic pole 3B for writing is scanned by the read element 3A, whereby the noise level is measured. Then, in STEP S43, the noise level measured at that time is stored in the data storage unit 17.

Next, the intensity of the laser beam is fixed. Then, in STEP S44, the current value of the write current I is set to I1 to flow in the magnetic pole 3B for writing in the opposite direction to that in STEP S41, and the magnetic disk 1 is scanned by the magnetic pole 3B for writing.

Next, in STEP S45, the magnetic disk 1 having been scanned by the magnetic pole 3B for writing is scanned by the read element 3A, whereby the noise level is measured. Then, in STEP S46, the noise level measured at that time is stored in the data storage unit 17.

Next, in STEP 47, the current value of the write current I is set at In with the intensity of the laser beam fixed such that $(I>(In-1))$ is satisfied, and the magnetic disk 1 is scanned by the magnetic pole 3B for writing. At this time, as the current value of the write current I increases, the regions where the magnetization reversal occurs increase.

Next, in STEP S48, the magnetic disk 1 having been scanned by the magnetic pole 3B for writing is scanned by the read element 3A, such that the noise level is measured. Then, in STEP S49, the noise level measured at that time is stored for each current value In of the write current I.

Next, if it is determined in STEP S50 whether the noise level does not change even if the noise level is made same as the noise level of STEP S42 or the current value In of the write current I is increased. Then, if the result of STEP S50 is positive, the measurement process returns to STEP S47, and the processes of STEPS S47 to S50 are repeated.

Next, in STEP S51, the noise distribution relative to the current value of the write current I is obtained in units of sectors on the basis of the noise level for the current value of the write current I stored in the data storage unit 17.

Next, the quality of the signal read by the read element 3A is determined in units of sectors on the basis of the noise distribution relative to the current value of the write current I. Then, in STEP S52, defect registration or an optimizing process is performed in units of sectors on the basis of the result of the determination of the signal quality SNR.

Fifth Embodiment

Figure 14A:
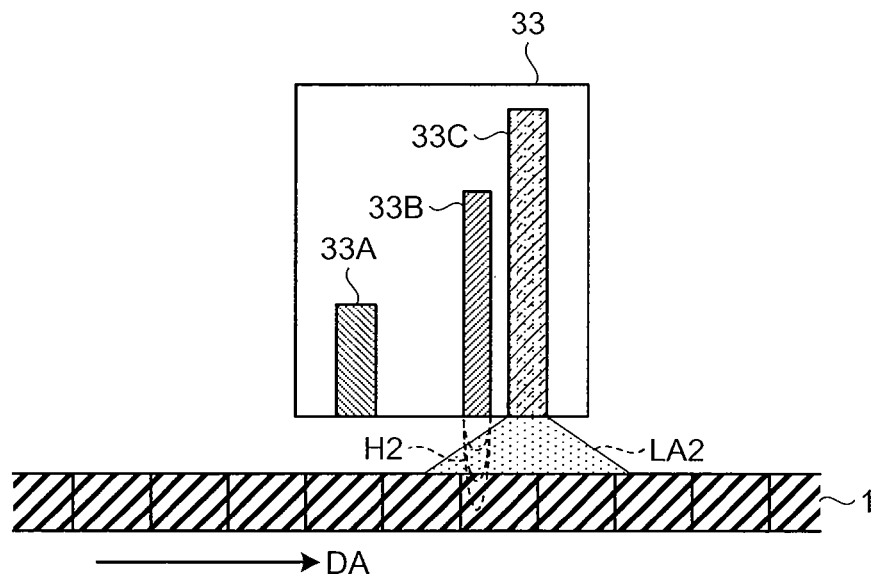
FIG. 14A is a cross-sectional view illustrating a thermally assisted magnetic recording method according to a fifth embodiment.
Figure 14B:
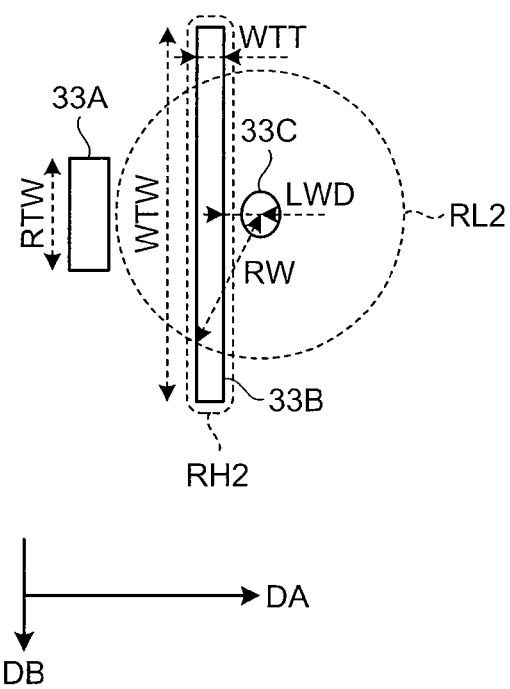
FIG. 14B is a plan view illustrating a relation between a magnetic field region and a heated region in the thermally assisted magnetic recording method of FIG. 14A.

FIG. 14A is a cross-sectional view illustrating a thermally assisted magnetic recording method according to a fifth embodiment, and FIG. 14B is a plan view illustrating a relation between a magnetic field region and a heated region in the thermally assisted magnetic recording method of FIG. 14A.

In FIG. 14, a magnetic head 33 includes a laser element 33C for irradiating a laser beam onto the magnetic disk 1, a read element 33A for reading a signal recoded in the magnetic disk 1, and a magnetic pole 33B for writing that performs magnetic recording on a laser beam irradiation region on the magnetic disk 1. The magnetic head 33 may include an optical waveguide for guiding a laser beam, instead of the laser element 33C. For example, an MR element can be sued as the read element 33A, and a coil element can be used as the magnetic pole 33B for writing.

Here, the write current flows in the magnetic pole 33B for writing, such that a magnetic flux H2 is generated around the magnetic pole 33B for writing, and a magnetic field RH2 for writing is generated on the magnetic disk 1. Further, a laser beam LA2 from the laser element 33C is radiated onto the magnetic disk 1, such that an irradiation region RL2 is formed on the magnetic disk 1 and the irradiation region RL2 is heated.

Here, the shapes and disposition of the read element 33A, the magnetic pole 33B for writing, and the laser element 33C can be set such that the overall width RTW of the read element 33A of the magnetic field RH2 for writing on the magnetic disk 1 formed by the magnetic pole 33B for writing overlap the irradiation region RL2.

For example, if it is assumed that the width of the read element 33A is RTW, the width of the magnetic pole 33B for writing is WTW, the thickness of the magnetic pole 33B for writing is WTT, and a distance from the center of the irradiation region RL2 to the magnetic pole 33B for writing is LWD, it is possible to satisfy conditions of $\{WTW \geq (1.5 \times RTW)\}$ and $\{(WTT+LWD) < (0.75 \times RTW)\}$ Here, for example, if it is assumed that a spot diameter $(2 \times RW)$ of the irradiation region RL2 is $(\sqrt{2} \times RTW \times 2)$, in a circumferential direction DA, the entire magnetic field RH2 for writing enters the irradiation region RL2. Further, a portion where the magnetic field RH2 for writing and the irradiation region RL2 overlap each other in a radial direction DB becomes 1.5 times or more the width RTW of the read element 33A.

Therefore, it is possible to completely put the portion where the magnetic field RH2 for writing and the irradiation region RL2 overlap each other, in a reading range of the read element 33A. Further, even in a case where the portion where the magnetic field RH2 for writing and the irradiation region RL2 overlap each other changes when any one of the intensity of the laser beam and the magnetic field for recording changes, since it becomes possible to uniformize the magnetic field in a range wider than the reading range of the read element 33A, it is possible to improve the accuracy of the evaluation on the quality of the signal read from the magnetic head 33.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A magnetic disk device comprising:
   a magnetic disk;
   a magnetic head that reads a signal recorded in the magnetic disk or performs magnetic recording while irradiating a laser beam onto the magnetic disk;
   a laser-beam-intensity control unit that controls the intensity of the laser beam;
   a reproduced-signal detecting unit that detects the signal read by the magnetic head; and
   a magnetic-disk evaluation unit that evaluates the quality of the signal read by the magnetic head, on the basis of a relation between a noise level detected from the signal read by the magnetic head, and the intensity of the laser beam.

2. The magnetic disk device according to claim 1, wherein the magnetic-disk evaluation unit comprises
   a noise calculating unit that calculates the noise level on the basis of the signal read by the magnetic head,
   a data storage unit that stores the noise level calculated by the noise calculating unit,
   a data computing unit that computes a noise distribution relative to the intensity of the laser beam, on the basis of the noise level stored in the data storage unit,
   a signal-quality determining unit that determines the quality of the signal read from the magnetic head, on the basis of the noise distribution, and
   a quality-evaluation control unit that changes the intensity of the laser beam on the basis of the noise level.

3. The magnetic disk device according to claim 2, wherein the noise distribution is computed in units of sectors of the magnetic disk, and the quality of the signal is determined in the units of sectors.

4. The magnetic disk device according to claim 3, further comprising:
   a defect registering unit that performs defect registration in the units of sectors on the basis of a result of the determination on the quality of the signal.

5. The magnetic disk device according to claim 3, further comprising:
   a memory that stores the intensity of the laser beam in the magnetic recording in the units of sectors.

6. The magnetic disk device according to claim 1 wherein the magnetic head comprises
   a laser irradiating unit that irradiates the laser beam onto the magnetic disk,
   a read element that reads the signal recorded in the magnetic disk, and
   a magnetic pole for writing that performs magnetic recording on a laser-beam irradiation region on the magnetic disk.

7. A magnetic disk device comprising:
   a magnetic disk;
   a magnetic head that reads a signal recorded in the magnetic disk or performs magnetic recording while irradiating a laser beam onto the magnetic disk;
   a write-current control unit that controls a write current in the magnetic recording;
   a reproduced-signal detecting unit that detects the signal read by the magnetic head;
   a magnetic-disk evaluation unit that evaluates the quality of the signal read by the magnetic head, on the basis of a relation between a noise level detected from the signal read by the magnetic head, and the current value of the write current.

8. The magnetic disk device according to claim 7, wherein the magnetic-disk evaluation unit comprises
   a noise calculating unit that calculates the noise level on the basis of the signal read by the magnetic head,
   a data storage unit that stores the noise level calculated by the noise calculating unit,
   a data computing unit that computes a noise distribution relative to the current value of the write current, on the basis of the noise level stored in the data storage unit,
   a signal-quality determining unit that determines the quality of the signal read from the magnetic head, on the basis of the noise distribution, and
   a quality-evaluation control unit that changes the current value of the write current on the basis of the noise level.

9. The magnetic disk device according to claim 8, further comprising:
   a defect registering unit that performs defect registration in the units of sectors on the basis of a result of the determination on the quality of the signal.

10. The magnetic disk device according to claim 9, further comprising:
    a memory that stores the intensity of the laser beam in the magnetic recording in the units of sectors.

11. The magnetic disk device according to claim 9, further comprising:
    a memory that stores the current value of the write current in the magnetic recording in the units of sectors.

12. The magnetic disk device according to claim 7, wherein the magnetic head comprises
    a laser irradiating unit that irradiates the laser beam onto the magnetic disk,
    a read element that reads the signal recorded in the magnetic disk, and
    a magnetic pole for writing that performs magnetic recording on a laser-beam irradiation region on the magnetic disk.

* * * * *